(No Model.)

G. N. TODD.
METHOD OF CONSTRUCTING PICKER STEMS.

No. 388,797. Patented Aug. 28, 1888.

Witnesses.
Wm R Rheem
Will R Crowhundro

Inventor.
Geo. N. Todd.
By Jno. G. Elliott.
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

METHOD OF CONSTRUCTING PICKER-STEMS.

SPECIFICATION forming part of Letters Patent No. 388,797, dated August 28, 1888.

Application filed December 13, 1887. Serial No. 257,763. (No model.)

*To all whom it may concern:*

Be it known that I, GEORGE N. TODD, a citizen of the United States, residing in Chicago, county of Cook, and State of Illinois, have invented certain new and useful Improvements in the Method for Producing Picker-Stems, of which the following is a specification.

This invention relates to improvements in the method of forming picker-stems to be used in cotton-harvesters, the general contour of which is that of a cylinder having teeth upon the periphery thereof pointing substantially at right angles to the length of the stem.

The prime object of this invention is to produce a picker-stem composed of a strip of sheet metal which shall combine all the functions, strength, and effectiveness of the usual hollow or solid cylindrical picker-stem, but at a greatly-reduced cost and materially-lessened weight, whereby material heretofore considered as waste may be utilized and the number of stems heretofore employed in cotton-harvesters greatly increased. I attain this object by means of the process hereinafter fully described, the steps and order of steps of which are fully set forth, and the results of which steps are illustrated in the accompanying drawings, in which—

Figure 1:
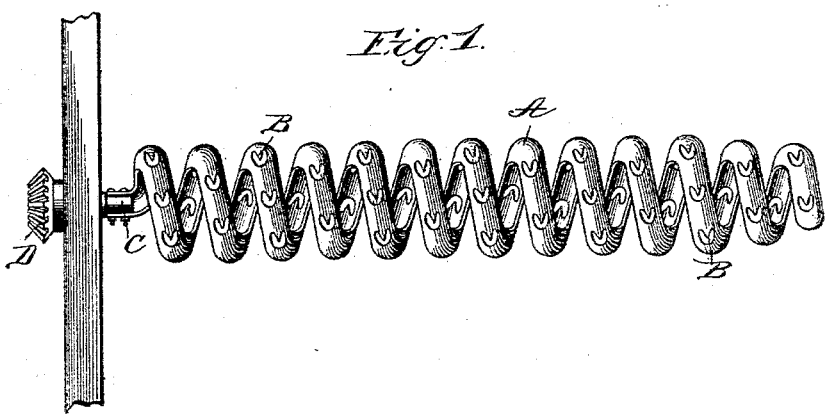
Figure 2:

Figure 1 represents a side elevation of a picker-stem complete, made in accordance with my process; Fig. 2, the blank from which the stem is formed, and Fig. 3 the blank bent before being coiled to form a stem.

In referring to the accompanying drawings, the same reference-letters refer to the same parts in the several figures of the drawings.

Figure 3:
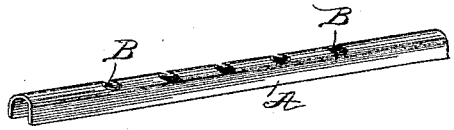

In carrying out my invention I first take a narrow strip of sheet metal, A, such as is shown in Fig. 2, but of a suitable length, and stamp or cut therein the teeth B, arranged in one or more longitudinal series about the center of width thereof, or else secure to such strip, by soldering, screwing, or otherwise, teeth formed independently thereof. The points of the teeth, whether integral or independent, should lie longitudinally of the strip, for the purpose hereinafter explained. I next bend the strip by hand or machinery transversely of its length, as shown in Fig. 3, thereby forming a concavo-convex strip with the teeth upon the convex surface thereof, after which the strip is formed into a spiral coil, as shown in Fig. 1, thereby forming the body of a picker-stem, which, while it has a general cylindrical form and is provided with teeth upon the periphery thereof, is composed of considerably less material than the ordinary cylindrical stem, and may be made of strips which have heretofore been considered as waste material. The other end of the spiral coil is wound upon a slightly-smaller arc than the main body, in order to form a rounded entering-point, or, if desired, a separate entering point or cap of any suitable construction may be provided for this purpose. The opposite or inner end of the coil, in order to form a complete picker-stem, is rigidly secured to the shank C of a small gear-wheel, D, by means of which latter a rotary motion may be imparted to the stem when mounted in a cotton-harvester. The teeth of the picker-stem, when complete or after the toothed strip has been wound into a spiral coil, point at substantially a right angle to the length of the stem, although longitudinally of the strip of which the stem is composed, the coiling of the strip producing this result, which of course is necessary, in order to render the picker-stem operative when rotated upon its axis, as is usual in cotton-harvesters.

A picker-stem produced in the manner herein described will possess all of the advantages common to the ordinary cylindrical stem, both of strength, effectiveness, and durability, without being nearly so heavy, and as a result a much larger number of such stems may be operated with a given amount of power than is possible with the stems as heretofore constructed, and such increase in the number of stems is desirable for obvious reasons.

Having described my invention, what I claim, and desire to secure by Letters Patent, is—

1. The herein-described methods for producing picker-stems for cotton-harvesters, the same consisting in winding into a spiral coil a toothed strip of metal and then securing to one end thereof a gear-wheel, substantially as and for the purpose described.

2. The herein-described methods for producing picker-stems for cotton-harvesters, the same consisting in first stamping, cutting, or otherwise forming teeth in or upon a flat strip of sheet metal, then bending said strip transversely of its length with the teeth upon the concave side thereof, then winding said strip into a spiral coil, and finally securing to one end of said coil a gear-wheel or its equivalent, substantially as described.

3. As a new article of manufacture, a picker-stem, the body of which is composed of a strip of toothed metal coiled spirally and having a gear-wheel or its equivalent secured to one end thereof, substantially as described.

GEORGE N. TODD.

Witnesses:
WILL R. OMOHUNDRO,
W. W. ELLIOTT.